US010050862B2

(12) United States Patent
Nambiar et al.

(10) Patent No.: US 10,050,862 B2
(45) Date of Patent: Aug. 14, 2018

(54) DISTRIBUTED APPLICATION FRAMEWORK THAT USES NETWORK AND APPLICATION AWARENESS FOR PLACING DATA

(71) Applicant: CISCO TECHNOLOGY, INC., San Jose, CA (US)

(72) Inventors: Raghunath O. Nambiar, San Ramon, CA (US); Karthik Krishna Kulkarni, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 575 days.

(21) Appl. No.: 14/617,591

(22) Filed: Feb. 9, 2015

(65) Prior Publication Data
US 2016/0234071 A1   Aug. 11, 2016

(51) Int. Cl.
G06F 15/173   (2006.01)
*H04L 12/701*   (2013.01)
H04L 12/26   (2006.01)

(52) U.S. Cl.
CPC ............. *H04L 45/00* (2013.01); *H04L 43/08* (2013.01)

(58) Field of Classification Search
USPC ................ 709/223, 224, 226, 227, 229, 232
See application file for complete search history.

(56) References Cited

U.S. PATENT DOCUMENTS

| 5,812,773 | A  | 9/1998  | Norin           |
| 5,889,896 | A  | 3/1999  | Meshinsky       |
| 6,108,782 | A  | 8/2000  | Fletcher et al. |
| 6,178,453 | B1 | 1/2001  | Mattaway et al. |
| 6,298,153 | B1 | 10/2001 | Oishi           |
| 6,343,290 | B1 | 1/2002  | Cossins et al.  |
| 6,643,260 | B1 | 11/2003 | Kloth et al.    |

(Continued)

FOREIGN PATENT DOCUMENTS

| CN | 101719930 | 6/2010 |
| CN | 101394360 | 7/2011 |

(Continued)

OTHER PUBLICATIONS

Lynch, Sean, "Monitoring cache with Chaspin," Facebook Engineering, Sep. 19, 2012.

(Continued)

*Primary Examiner* — Liangche A Wang
(74) *Attorney, Agent, or Firm* — Polsinelli PC (57) ABSTRACT

A distributed application framework, along with related systems and/or methods described herein, can intelligently place data using network knowledge. An exemplary method can include receiving data placement information from a distributed application that identifies a source node of data in a network and a list of potential destination nodes in the network for the distributed application to place the data; for each potential destination node, determining a network latency associated with transferring the data from the source node to the potential destination node using network metrics associated with the network; and sending the determined network latencies to the distributed application, such that the distributed application can assign the data to one of the potential destination nodes based on the determined network latencies.

20 Claims, 3 Drawing Sheets

(56) References Cited

U.S. PATENT DOCUMENTS

| | | | |
|---|---|---|---|
| 6,683,873 B1 | 1/2004 | Kwok et al. | |
| 6,721,804 B1 | 4/2004 | Rubin et al. | |
| 6,733,449 B1 | 5/2004 | Krishnamurthy et al. | |
| 6,735,631 B1 | 5/2004 | Oehrke et al. | |
| 6,996,615 B1 | 2/2006 | McGuire | |
| 7,054,930 B1 | 5/2006 | Cheriton | |
| 7,058,706 B1* | 6/2006 | Iyer | H04L 43/0852 709/223 |
| 7,062,571 B1 | 6/2006 | Dale et al. | |
| 7,111,177 B1 | 9/2006 | Chauvel | |
| 7,212,490 B1* | 5/2007 | Kao | H04L 12/42 370/222 |
| 7,277,948 B2 | 10/2007 | Igarashi et al. | |
| 7,313,667 B1 | 12/2007 | Pullela et al. | |
| 7,379,846 B1 | 5/2008 | Williams et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,567,504 B2 | 7/2009 | Darling et al. | |
| 7,606,147 B2 | 10/2009 | Luft | |
| 7,647,594 B2 | 1/2010 | Togawa | |
| 7,773,510 B2 | 8/2010 | Back | |
| 7,808,897 B1 | 10/2010 | Mehta et al. | |
| 7,881,957 B1 | 2/2011 | Cohen et al. | |
| 7,917,647 B2 | 3/2011 | Cooper et al. | |
| 8,010,598 B2 | 8/2011 | Carter | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,301,746 B2 | 10/2012 | Head et al. | |
| 8,345,692 B2 | 1/2013 | Smith | |
| 8,406,141 B1 | 3/2013 | Couturier et al. | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,495,356 B2 | 7/2013 | Ashok et al. | |
| 8,510,469 B2 | 8/2013 | Portolani | |
| 8,514,868 B2 | 8/2013 | Hill | |
| 8,532,108 B2 | 9/2013 | Li et al. | |
| 8,533,687 B1 | 9/2013 | Greifeneder et al. | |
| 8,547,974 B1 | 10/2013 | Guruswamy et al. | |
| 8,560,639 B2 | 10/2013 | Murphy et al. | |
| 8,560,663 B2 | 10/2013 | Baucke et al. | |
| 8,589,543 B2 | 11/2013 | Dutta | |
| 8,590,050 B2 | 11/2013 | Nagpal et al. | |
| 8,611,356 B2 | 12/2013 | Yu et al. | |
| 8,612,625 B2 | 12/2013 | Andreis et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan | |
| 8,660,129 B1 | 2/2014 | Brendel et al. | |
| 8,719,804 B2 | 5/2014 | Jain | |
| 8,775,576 B2 | 7/2014 | Hebert et al. | |
| 8,797,867 B1 | 8/2014 | Chen | |
| 8,805,951 B1 | 8/2014 | Faibish et al. | |
| 8,850,182 B1 | 9/2014 | Fritz et al. | |
| 8,856,339 B2 | 10/2014 | Mestery et al. | |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,959,526 B2 | 2/2015 | Kansal | |
| 8,977,754 B2 | 3/2015 | Curry, Jr. et al. | |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 | 12/2015 | Chang et al. | |
| 9,203,784 B2 | 12/2015 | Chang et al. | |
| 9,223,634 B2 | 12/2015 | Chang et al. | |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,313,048 B2 | 4/2016 | Chang et al. | |
| 9,361,192 B2 | 6/2016 | Smith et al. | |
| 9,380,075 B2 | 6/2016 | He et al. | |
| 9,432,294 B1 | 8/2016 | Sharma et al. | |
| 9,444,744 B1 | 9/2016 | Sharma et al. | |
| 9,473,365 B2 | 10/2016 | Melander et al. | |
| 9,503,530 B1 | 11/2016 | Niedzielski | |
| 9,558,078 B2 | 1/2017 | Farlee et al. | |
| 9,613,078 B2 | 4/2017 | Vermeulen et al. | |
| 9,628,471 B1 | 4/2017 | Sundaram et al. | |
| 9,658,876 B2 | 5/2017 | Chang et al. | |
| 9,692,802 B2 | 6/2017 | Bicket et al. | |
| 9,755,858 B2 | 9/2017 | Bagepalli et al. | |
| 2002/0073337 A1 | 6/2002 | Ioele et al. | |
| 2002/0143928 A1 | 10/2002 | Maltz et al. | |
| 2002/0166117 A1 | 11/2002 | Abrams et al. | |
| 2002/0174216 A1 | 11/2002 | Shorey et al. | |
| 2003/0018591 A1 | 1/2003 | Komisky | |
| 2003/0056001 A1 | 3/2003 | Mate et al. | |
| 2003/0228585 A1 | 12/2003 | Inoko et al. | |
| 2004/0004941 A1 | 1/2004 | Malan et al. | |
| 2004/0095237 A1 | 5/2004 | Chen et al. | |
| 2004/0131059 A1 | 7/2004 | Ayyakad | |
| 2004/0264481 A1 | 12/2004 | Darling et al. | |
| 2005/0060418 A1 | 3/2005 | Sorokopud | |
| 2005/0125424 A1 | 6/2005 | Herriott et al. | |
| 2006/0104286 A1 | 5/2006 | Cheriton | |
| 2006/0126665 A1 | 6/2006 | Ward et al. | |
| 2006/0146825 A1 | 7/2006 | Hofstaedter et al. | |
| 2006/0155875 A1 | 7/2006 | Cheriton | |
| 2006/0168338 A1* | 7/2006 | Bruegl | G06F 17/30902 709/240 |
| 2007/0174663 A1 | 7/2007 | Crawford et al. | |
| 2007/0223487 A1 | 9/2007 | Kajekar | |
| 2007/0242830 A1 | 10/2007 | Conrado et al. | |
| 2008/0005293 A1 | 1/2008 | Bhargava et al. | |
| 2008/0084880 A1 | 4/2008 | Dharwadkar | |
| 2008/0165778 A1 | 7/2008 | Ertemalp | |
| 2008/0198752 A1 | 8/2008 | Fan et al. | |
| 2008/0201711 A1 | 8/2008 | Amir Husain | |
| 2008/0235755 A1 | 9/2008 | Blaisdell et al. | |
| 2009/0006527 A1 | 1/2009 | Gingell, Jr. et al. | |
| 2009/0019367 A1 | 1/2009 | Cavagnari et al. | |
| 2009/0031312 A1 | 1/2009 | Mausolf | |
| 2009/0083183 A1 | 3/2009 | Rao et al. | |
| 2009/0138763 A1 | 5/2009 | Arnold | |
| 2009/0177775 A1 | 7/2009 | Radia et al. | |
| 2009/0178058 A1 | 7/2009 | Stillwell | |
| 2009/0182874 A1 | 7/2009 | Morford | |
| 2009/0265468 A1 | 10/2009 | Annambhotla et al. | |
| 2009/0265753 A1 | 10/2009 | Anderson et al. | |
| 2009/0293056 A1 | 11/2009 | Ferris | |
| 2009/0300608 A1 | 12/2009 | Ferris et al. | |
| 2009/0313562 A1 | 12/2009 | Appleyard et al. | |
| 2009/0323706 A1 | 12/2009 | Germain et al. | |
| 2009/0328031 A1 | 12/2009 | Pouyadou et al. | |
| 2010/0042720 A1 | 2/2010 | Stienhans et al. | |
| 2010/0061250 A1 | 3/2010 | Nugent | |
| 2010/0115341 A1 | 5/2010 | Baker et al. | |
| 2010/0131765 A1 | 5/2010 | Bromley et al. | |
| 2010/0191783 A1 | 7/2010 | Mason et al. | |
| 2010/0192157 A1 | 7/2010 | Jackson et al. | |
| 2010/0205601 A1 | 8/2010 | Abbas et al. | |
| 2010/0211782 A1 | 8/2010 | Auradkar et al. | |
| 2010/0293270 A1 | 11/2010 | Augenstein et al. | |
| 2010/0318609 A1 | 12/2010 | Lahiri et al. | |
| 2010/0325199 A1 | 12/2010 | Park et al. | |
| 2010/0325441 A1 | 12/2010 | Laurie et al. | |

(56) References Cited

U.S. PATENT DOCUMENTS

| | | |
|---|---|---|
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou |
| 2013/0254415 A1* | 9/2013 | Fullen .................. H04L 67/101 709/230 |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova et al. |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1* | 9/2014 | Kato ................. G06F 17/30371 707/638 |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |

(56) References Cited

U.S. PATENT DOCUMENTS

| | | |
|---|---|---|
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0178133 A1 | 6/2015 | Phelan |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2211502 | 7/2010 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

USPTO Feb. 9, 2017 Non-Final Office Action from U.S. Appl. No. 14/327,385.

USPTO Jun. 7, 2016 Non-Final Office Action from U.S. Appl. No. 14/499,000.

USPTO Mar. 10, 2016 Non-Final Office Action from U.S. Appl. No. 14/327,385.

USPTO Aug. 23, 2016 Final Office Action from U.S. Appl. No. 14/327,385.

USPTO Nov. 2, 2016 Final Office Action from U.S. Appl. No. 14/499,000.

USPTO Mar. 7, 2017 Non-Final Office Action from U.S. Appl. No. 14/499,000.

U.S. Appl. No. 14/499,000, filed Sep. 26, 2014, entitled "Distributed Application Framework for Prioritizing Network Traffic Using Application Priority Awareness," Inventors: Karthik Kulkarni, et al.

U.S. Appl. No. 14/327,385, filed Jul. 9, 2014, entitled "Network Traffic Management Using Heat Maps With Actual and Planned/Estimated Metrics," Inventors: Karthik Kulkarni, et al.

Szymaniak, et al., "Latency-Driven Replica Placement", vol. 47 No. 8, IPSJ Journal, Aug. 2006, 12 pages; ftp://ftp.minix3.org/pub/steen/papers/2006.ipsj.pdf.

Xianglong, et al., "A Novel Blocks Placement Strategy for Hadoop", 2012 IEEE/ACTS 11th International Conference on Computer and Information Science, 2012 IEEE, 5 pages; http://www.cs.odu.edu/~mukka/cs775s13/Presentations/papers/paper5.pdf.

Amedro, Brian, et al., "An Efficient Framework for Running Applications on Clusters, Grids and Cloud," 2010, 17 pages.

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, A White Paper from the Open Cloud Standards Incubator," Version 1.0.0, Document No. DSP-IS0102, Jun. 18, 2010, 57 pages.

Author Unknown, "Cloud Infrastructure Management Interface—Common Information Model (CIMI-CIM)," Document No. DSP0264, Version 1.0.0, Dec. 14, 2012, 21 pages.

Author Unknown, "Cloud Infrastructure Management Interface (CIMI) Primer," Document No. DSP2027, Version 1.0.1, Sep. 12, 2012, 30 pages.

Author Unknown, "cloudControl Documentation," Aug. 25, 2013, 14 pages.

Author Unknown, "Interoperable Clouds, A White Paper from the Open Cloud Standards Incubator," Version 1.0.0, Document No. DSP-IS0101, Nov. 11, 2009, 21 pages.

Author Unknown, "Microsoft Cloud Edge Gateway (MCE) Series Appliance," Iron Networks, Inc., 2014, 4 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Author Unknown, "Use Cases and Interactions for Managing Clouds, A White Paper from the Open Cloud Standards Incubator," Version 1.0.0, Document No. DSP-ISO0103, Jun. 16, 2010, 75 pages.

Author Unknown, "Apache Ambari Meetup What's New," Hortonworks Inc., Sep. 2013, 28 pages.

Author Unknown, "Introduction," Apache Ambari project, Apache Software Foundation, 2014, 1 page.

Beyer, Steffen, "Module "Data::Locations?!"," YAPC::Europe, London, UK,ICA, Sep. 22-24, 2000, XP002742700, 15 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

Broadcasters Audience Research Board, "What's Next," http://lwww.barb.co.uk/whats-next, accessed Jul. 22, 2015, 2 pages.

(56) References Cited

OTHER PUBLICATIONS

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.

* cited by examiner

DISTRIBUTED APPLICATION FRAMEWORK THAT USES NETWORK AND APPLICATION AWARENESS FOR PLACING DATA

TECHNICAL FIELD

This disclosure relates in general to the field of communications and, more particularly, to a system and a method for intelligently placing data in a network environment.

BACKGROUND

Data centers are increasingly used by enterprises to achieve collaboration, store data, manage resources, etc. A typical data center network contains myriad network elements. The network connecting the network elements provides secure user access to data center services and an infrastructure for deployment, interconnection, and aggregation of shared resource as required, including applications, servers, appliances, and storage. Improving operational efficiency and optimizing utilization of data center resources are some of the challenges facing data center managers. Data center managers want a resilient infrastructure that consistently supports diverse applications and services and protects the applications and services against disruptions. To address these considerations, data centers are turning to distributed application frameworks, striving to provide infrastructure that optimizes deployment of distributed application frameworks, while enhancing network performance associated with using distributed application frameworks.

BRIEF DESCRIPTION OF DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A distributed application framework, along with related network aware systems and/or methods, can intelligently place data using network knowledge. An exemplary method can include receiving data placement information from a distributed application that identifies a source node of data in a network and a list of potential destination nodes in the network for the distributed application to place the data; for each potential destination node, determining a network latency associated with transferring the data from the source node to the potential destination node using network metrics associated with the network (which can include planned network metrics and/or estimated network metrics); and sending the determined network latencies to the distributed application, such that the distributed application can assign the data to one of the potential destination nodes based on the determined network latencies. The network metrics may be collected from the network and the distributed application. The method can further include, based on the determined network latencies, identifying a best potential destination node for placing the data from the potential destination nodes. The best potential destination node may exhibit a lowest network latency. The method can further include ranking potential destination nodes having a same determined network latency by weighting one network metric over another network metric.

In various implementations, the method further includes generating planned network metrics for the network, wherein the planned network metrics indicate future utilization of the network, and further wherein the network metrics used to determine the network latency include the planned network metrics. The planned network metrics may be updated once the distributed application assigns the data to one of the potential destination nodes. Generating the planned network metrics may include determining storage capabilities for each of the potential destination nodes. In various implementations, for each potential destination node, the network latency is a function of one or more of the following network metrics: a number of hops between the source node and the potential destination node; an aggregate network latency of network elements associated with each hop between the source node and the potential destination node; an aggregate time for transferring data based on data size and network bandwidth associated with each hop between the source node and the potential destination node; an aggregate time for transferring data based on data size and planned available network bandwidth associated with each hop between the source node and the potential destination node; a planned input/output bandwidth for the potential destination node for the future time period; and an input/output operations per second for the potential destination node. The method may further include weighting the network metrics to determine the network latency.

Example Embodiments

Figure 1:
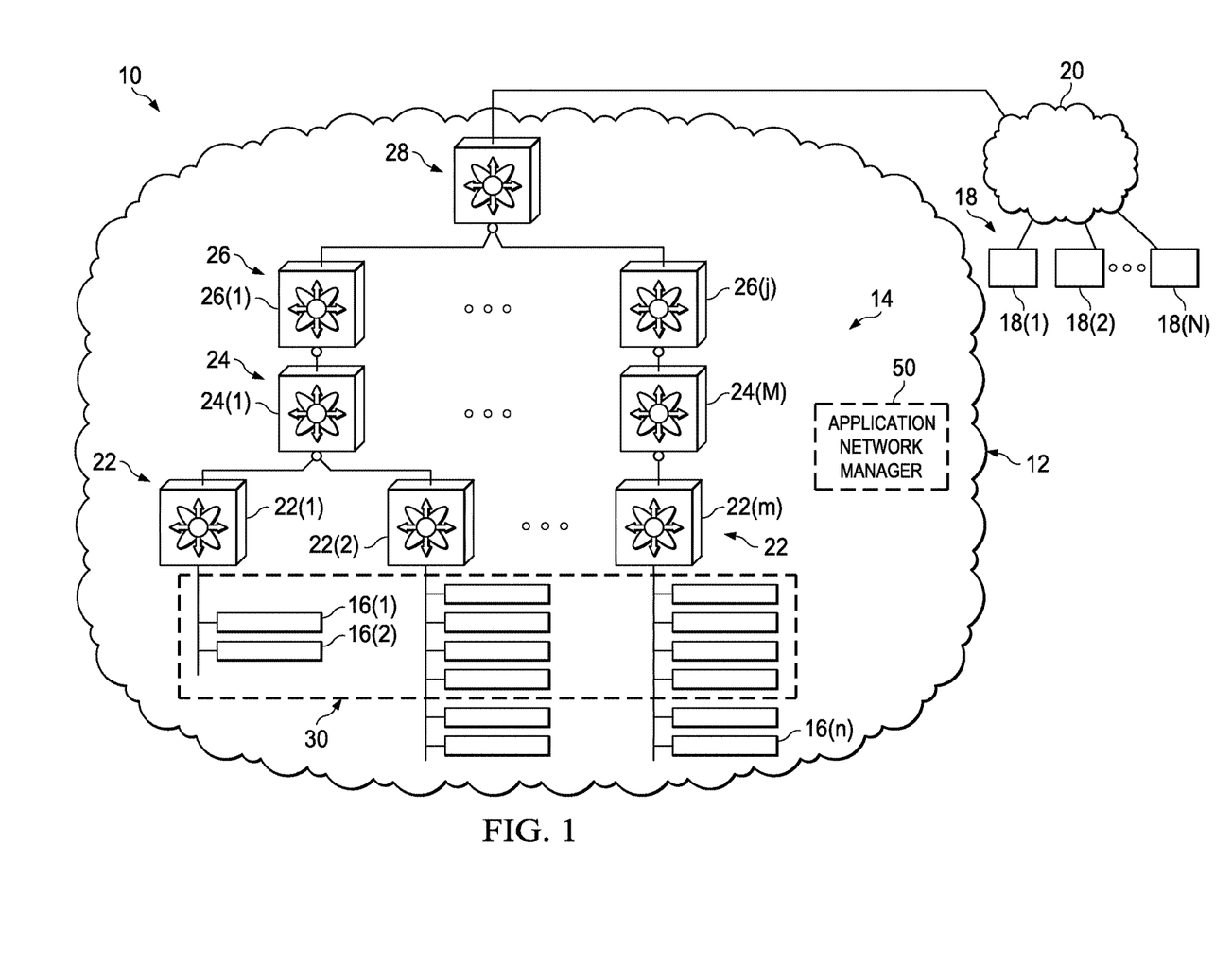
FIG. 1 is a simplified schematic block diagram illustrating a communication system for prioritizing network traffic in a network environment.
Figure 2:
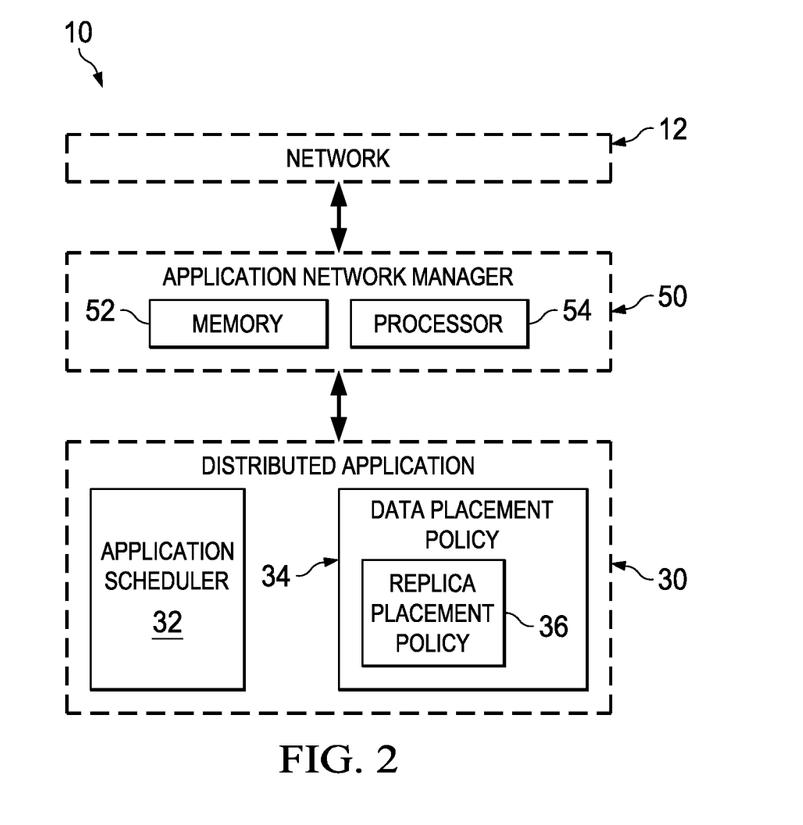
FIG. 2 is a simplified block diagram illustrating example details of the communication system.

FIG. 1 is a simplified schematic block diagram illustrating a communication system 10 for managing network traffic (also referred to as data traffic) in a network environment; and FIG. 2 is a simplified block diagram illustrating an exemplary configuration of communication system 10. For ease of discussion, FIG. 1 and FIG. 2 will be described concurrently. In FIG. 1, communication system 10 includes a network 12. In various embodiments, network 12 can represent an enterprise network, such as a data center network, operated and controlled by a particular entity or organization. In some configurations, network 12 can provide other networks with access to network 12 and authorization to set up secure tunnel(s) with network 12 in accordance, for example, with service level agreements (SLAs).

Network 12 includes a network 14 (generally shown as various links) that interconnect hosts 16(1), 16(2), ..., and 16(n) (generally referred to as hosts 16) and external hosts 18(1), 18(2), ..., and 18(N) (generally referred to as external hosts 18), where n represents a total number of hosts 16 and N represents a total number of external hosts 18. External hosts 18 connect to network 12 over an external network 20. Hosts 16 can communicate (for example, by receiving/forwarding packets) with each other over network 12, and hosts 16 can communicate (for example, by receiving/forwarding packets) with external hosts 18 connected to network 12 over external network 20. Hosts 16 and/or external hosts 18 can provide various information technology services, including web services, database services, data processing services, directory services, and/or other services to network elements. In various embodiments, hosts 16 and/or external hosts 18 can be associated with users (clients) and/or groups that use information technology services provided by network 12. As used herein, the term "host" may include any network element, physical (for example, servers) or virtual (for example, virtual machines), connected to other network elements over a network; and the term "external host" may include any host connected to a network (e.g., network 12) over an external network (e.g., external network 20). Hosts can be servers, applications, network storage facilities (for example, a database and/or a memory), and/or other network elements. In a client-server model, hosts may include servers. In a peer-to-peer network, each computer may be a host.

Network 14 includes various network nodes configured to perform aggregate/core/access roles. For example, network 14 may include access switches, aggregation switches, and/or core switches to aggregate and distribute ingress (upstream traffic) and egress (downstream traffic) traffic, etc. A plurality of switches (virtual and/or physical) may be provided at each access, aggregation, and core level to achieve redundancy within network 12. In the depicted embodiment, network 14 includes top of rack (ToR) switches 22(1), 22(2), . . . , and 22(m) (generally referred to as leaf switches 22) that connect hosts 16 to network 12, where m is a total number of ToR switches 22; access switches 24(1), 24(2), . . . , and 24(M) (generally referred to as access switches 24) that aggregate network traffic from ToR switches 22, where M is a total number of access switches 24; core switches 26(1), 26(2), . . ., and 26(j) (generally referred to as core switches 26) that aggregate network traffic from access switches 24, where j is a total number of core switches 26; and aggregate switches 28 that aggregate network traffic from core switches 26, and further connect external network 20 and/or external hosts 18 to network 12. ToR switches 22, access switches 24, core switches 26, and aggregate switches 28 can connect to network 12 via network interfaces, such as ports through which ToR switches 22, access switches 24, core switches 26, and/or aggregate switches 28 connect to one another. In various embodiments, each ToR switch 22 can serve as a Top-Of-Rack (ToR) switch of a respective rack unit in a data center network environment, where network 12 serves as the data center network. ToR switches 22 can include host interfaces, for example, ports through which hosts 16 connect to ToR switches 22, such that ToR switches 22 can forward packets between hosts 16 over network 12 via access switches 24, core switches 26, and/or aggregate switches 28. Aggregate switches 28 can connect to external network 20 via another network interface, such that aggregate switches 28 can forward packets between hosts 16 and external hosts 18 over network 12 via core switches 26, access switches 24, and/or ToR switches 22. In some network topologies, network 14 can include one level of switches (such as a 2-tier fat tree topology) or multiple levels of switches (such as a 3-tier fat tree topology). Virtually any number of switches may be used in network 12 depending on network topology considerations for communication system 10. Furthermore, network 14 may alternately be configured to achieve spine/leaf network topologies that include leaf switches, border leaf switches, and/or spine switches (also referred to as a fabric spine).

As used herein, the term "switch" includes any network element configured to receive packets from a source (e.g., host 16(1)) and forward packets appropriately to a destination in a network (e.g., host 16(n)) or a destination out of network (e.g., external host 18(1)). The term "ToR switch" is inclusive of routers, switches, and such other network elements with packet routing, bridging, and switching functionalities that are connected to one or more hosts (e.g., hosts 16). The term "aggregate switch" is inclusive of routers, switches, and such other network elements with packet routing, bridging, and switching functionalities that are connected to external entities, such as one or more external hosts (e.g., external hosts 18). The term "access switch" and/or "core switch" is inclusive of routers, switches, and such other network elements with packet routing, bridging, and switching functionalities that connect one or more switches (e.g., ToR switches 22, access switches 24, core switches 26, and/or aggregate switches 28). Further, the terms "ToR," "access," "core," and "aggregate" are used merely to distinguish between layers of switches in the network architecture depicted in FIG. 1, and are not meant to be limitations. Furthermore, as used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof. This may be inclusive of appropriate algorithms and communication protocols that allow for the effective exchange of data or information.

Communication system 10 can include a network topology configured to include any number of servers, virtual machines, switches, routers, and other network nodes interconnected to form network 12. Network elements of FIG. 1 and FIG. 2 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of Transmission Control Protocol/Internet Protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Furthermore, the exemplary network environment may be configured over a physical infrastructure that includes one or more networks and, further, can be configured in any form including, but not limited to, local area networks (LANs), wireless local area networks (WLANs), virtual local area networks (VLANs), metropolitan area networks (MANs), wide area networks (WANs), virtual private networks (VPNs), Internet, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

For purposes of illustrating the techniques of communication system 10, it is important to understand the communications in a given system such as the architecture shown in FIG. 1 and FIG. 2. The following foundational information may be viewed as a basis from which the present disclosure may be properly explained. Such information is offered earnestly for purposes of explanation only and, accordingly, should not be construed in any way to limit the broad scope of the present disclosure and its potential applications.

Today's network environments, particularly data center network environments, store and analyze a massive amount of data. Challenges arise with how to analyze this massive amount of data to find critical pieces of information, which can provide a competitive edge. To address these challenges, network environments are turning to distributed application frameworks, striving to provide infrastructure that optimizes deployment of distributed application frameworks, while enhancing network performance associated with using distributed application frameworks. Distributed application frameworks can span across an entire network, where application workloads are distributed among multiple network elements of the network. As used herein, the term "distributed application" refers to software that executes or runs on multiple network elements (e.g., hosts 16, physical or virtual) in a network (e.g., network 12) to achieve a specific goal or task. Further, note that the term "application" as used herein can be inclusive of an executable file having instructions that can be understood and processed by a processor, including a computer, and may further include library modules loaded during execution, object files, system files, hardware logic, software logic, or any other executable modules.

Distributed applications may not have a fixed topology. For example, each instance of a distributed application may include a different logical set of applications that provide the same functionalities, but run on disparate network elements (e.g., hosts 16) that execute distributed applications at any instant in time, which may vary with network load, resource availability, and/or other network considerations. A distributed application can include multiple tiers, where each tier embodies various hardware, software, and management tools with myriad configuration parameters. Moreover, distributed applications can run over heterogeneous hardware platforms and operating systems. In a logical sense, a distributed application may include several layers of applications, for example, a web application layer that supports hypertext transfer protocol (HTTP) requests from users (e.g., associated with hosts 16 and/or external hosts 18); an application layer that provides personalized content to users; and a database layer that supports content management, business object persistence, and other data storage needs. In another logical sense, the distributed application may include a presentation layer (e.g., static web pages, Ajax pages, etc.); a business layer (e.g., Enterprise JavaBeans (EJB), legacy applications, etc.); and/or a persistence layer (e.g., relational databases, file servers, etc.).

Apache™ Hadoop® is an exemplary distributed application that will be used for purposes of describing details of the present disclosure, though details of the present disclosure are relevant to any distributed application, as described further below. Hadoop® can handle massive amounts of data—either transforming data to a more usable structure and format or analyzing and extracting valuable analytics from data. In particular, a Hadoop® application framework can store data sets across a cluster of servers (a Hadoop® distributed file system (HDFS) component) and then perform distributed processing on the cluster (a MapReduce component). Hadoop® clusters can include various nodes distributed across the network that store and/or process data. The HDFS component receives a data file (often referred to as input data), splits the data file into data blocks, and distributes the data blocks among the nodes. The data blocks are processed by the MapReduce component to generate result files, which can be stored in the HDFS component. To enhance reliability and availability of data, data assigned to one node is replicated among other nodes. This replication helps ensure that data can survive node failure or node unavailability. When processing the data, MapReduce workload processing can be divided into a map phase and a reduce phase. In various embodiments, the map phase includes dividing a submitted workload (data file) into smaller sub-workloads (data sub-blocks) and assigning the sub-workloads to mappers, where each mapper can process a sub-workload of the data file and output a sorted list of key-and-value pairs, which can be distributed and/or shuffled to reducers. Each reducer analyzes, condenses, and merges the list of key-value pairs to produce an output (results), which can be stored as a results file. Shuffle traffic can be associated with the process of sorting and transferring the list of key-and-value pairs to reducers. Hadoop® application framework thus manages various types of network traffic, such as ingest traffic, replication traffic, shuffle traffic, and/or other type traffic. Other distributed application frameworks also manage various types of network traffic in distributed processing environments.

Typically, distributed application frameworks, such as Hadoop® application frameworks, manage network traffic without considering associated underlying networks, essentially treating the underlying networks as a black box. This can present problems when placing data within the network, particularly when the underlying network manages data approaching big data levels (for example, hundreds of terabytes of data) over a medium to large cluster of servers (for example, hundreds to thousands of servers). For example, as noted above, distributed application frameworks store data across a cluster of servers (nodes), where data assigned to one server is replicated among other servers to prevent data loss (resulting from, for example, a disk failure) and/or to enhance data management performance by allowing different servers (or nodes) to operate on the same data. In some implementations, distributed application frameworks place data replicas randomly within the cluster of servers, for example, by choosing several different servers having storage to place the replicas. For example, where data is replicated three times, distributed application frameworks can randomly choose three different servers for storing the three replicas. In other implementations, distributed application frameworks may place data replicas using rack awareness, placing the replicas across different servers and different racks. For example, where data is replicated three times, distributed application frameworks may store two replicas on two different servers of a rack and one replica on a server of another rack. Spreading the replicas over different servers and different racks can prevent data loss resulting from server crashes and/or rack power failures, where all data would be lost if all the replicas were stored on different servers of a same rack that experienced power failure. Though placing data randomly and using rack awareness sufficiently protect against data failures, data placement inefficiencies often arise as networks expand to include multiple servers distributed across multiple racks, and even distributed over multiple networks (such as multiple data center clusters of servers), where multi-hop network topologies (including multiple switches and/or routers) are often implemented to facilitate placing the data over the expanded networks. In various implementations, distributed application frameworks may experience performance delays while placing data, including lack of service, when clogged routes or multi-hop routes are chosen to place data.

Communication system 10 is configured to address the issues described above (and others) in offering a system and method for managing network traffic using application level awareness in a network environment. Embodiments of communication system 10 provide for a distributed application framework for intelligently placing data using network awareness and application awareness. By bringing network intelligence to the application level, communication system 10 can intelligently place data based on various network metrics, optimizing network utilization. In contrast to other data placement schemes that often consider only application level intelligence (for example, placing data randomly based on network node capabilities and/or placing data based on network locality as described above), data placement schemes described herein can improve network utilization by distributed applications, including improving network and distributed application performance, improving network throughput, and/or minimizing network bottlenecks. Different embodiments may have different advantages than described herein, and no particular advantage is necessarily required of any of the embodiments described herein.

Turning to FIG. 1 and FIG. 2, network 12 provides an infrastructure for deploying a distributed application framework having network knowledge and application knowledge that can be used for intelligently placing data among network nodes. For example, a distributed application 30 is deployed in network 12 spanning various hosts 16. Distributed application 30 can distribute application workloads to the various hosts 16 for processing (to include storing) using network intelligence. In various embodiments, network 12 can provide an infrastructure for deploying a Hadoop® application framework, where in the present example, distributed application 30 can represent the Hadoop® application framework. In such configurations, a user can initiate a job by loading data into a cluster of hosts 16 (such as a cluster of servers) and describe how to analyze the data. The cluster of hosts 16 can process the data, including storing, replicating, and shuffling the data among the cluster of hosts 16, to generate results and store the job results. The user can access the results from the cluster of hosts 16. In various implementations, to enhance reliability and availability of data, data assigned to one node is replicated among other nodes. For example, distributed application 30 can define a number of copies, or replicas, of the data to place among network nodes (such as hosts 16) in network 12. A modifiable default replica requirement can be set, for example, to three replicas. In such a scenario, when data is stored on a first node, the first node can initiate a replication process to replicate the data onto a second node, and the second node can then replicate the data to a third node, such that the data is stored on three different data nodes (here, three different hosts 16).

In FIG. 2, distributed application 30 includes an application scheduler 32. Application scheduler 32 can accept jobs from users and schedule corresponding workloads for execution on hosts 16 that are part of distributed application 30. Each host 16 that is spanned by distributed application 30 acts as a work node that can carry out tasks specified by application scheduler 32, where hosts 16 spanned by distributed application 30 can handle multiple tasks in parallel. Application scheduler 32 can split the requested job into workloads (or tasks) and distribute the workloads on hosts 16 that are spanned by distributed application 30. In various embodiments, when application scheduler 32 receives a request to execute a job within distributed application 30, application scheduler 32 determines what resources are available for executing the requested job, including what resources are available for placing (storing) data associated with the workloads. Application scheduler 32 can determine where to place data among hosts 16 using a data placement policy 34, along with a scheduling policy. Data placement policy 34 can specify guidelines for selecting network nodes (such as hosts 16), including but not limited to, node availability, node capacity, node locality, data placement cost, data transfer costs, network topology, user preferences associated with the storage node, and/or other data placement guideline. Data placement policy 34 can include a replica placement policy 36, which can define the modifiable default replica requirement, along with guidelines for selecting network nodes (such as hosts 16) for placing the replica. For example, data placement policy 34 and/or replica placement policy 36 may define a rack awareness policy that specifies that data should be placed on network nodes associated with different racks. Application scheduler 32 can then consider node locality when making data placement decisions, ensuring that data is placed on network nodes associated with different racks. Distributed application 30 can thus employ data placement policy 34, replica placement policy 36, scheduling policy, and/or other policy to optimize data placement. The present disclosure contemplates various implementations where other components and/or modules associated with distributed application 30 can make data placement decisions, other than application scheduler 32.

In various implementations, when deciding where to place data from a source node X, distributed application 30 (such as application scheduler 32) can identify candidates based on data placement policy 34, replica placement policy 36, scheduling policy, and/or other policy. For example, distributed application 30 can generate a list of potential destination nodes Y1, Y2, . . . , Y(j-1), and Yj for the data, where j is a total number of potential destination nodes for placing the data. According to teachings of the present disclosure, and described in detail below, distributed application 30 can assign the data to one of the candidates using network intelligence. More specifically, distributed application 30 can glean network metrics associated with transferring data from source node X to each candidate. The various network metrics can include a number of hops between source node X and each candidate (where a fewer number of hops can optimize data placement), a network latency associated with each network element involved with transferring the data from source node X to each candidate (where a lower network latency can optimize data placement), a bandwidth associated with each network element involved with transferring the data from source node X to each candidate (where a higher bandwidth can optimize data placement), a bandwidth associated with each candidate (where a higher bandwidth can optimize data placement), a planned network metric associated with each network element involved with transferring the data from source node X to each candidate (where a planned network metric indicating higher availability over a time period, and thus anticipating less use for the foreseeable future, can optimize data placement), a planned network metric associated with each candidate (where a planned network metric indicating higher availability over a time period, and thus anticipating less use for the foreseeable future, can optimize data placement), a planned available storage input/output (IO) bandwidth (such as a storage disk IO bandwidth) for each candidate (where a planned storage IO bandwidth metric indicating higher availability over a time period, and thus anticipating less use for the foreseeable future, can optimize data placement), a storage input/output per second (IOPS) for each candidate (where a higher IOPS an optimize data placement), and/or other network metric. In various implementations, distributed application 30 can use the various network metrics to assign data to one of the candidates (such as one of potential destination nodes Y1, Y2, . . . , Y(j-1), and Yj) that minimizes an overall network latency associated with transferring the data from source node X.

In the distributed application framework described herein, an application network manager 50 (also referred to as an application network controller) can bring intelligence of distributed application 30 to network 12 (for example, network elements of network 14 can direct network traffic using application priority awareness gleaned from application network manager 50) and intelligence of network 12 to distributed application 30 (for example, distributed application 30 can place data using network awareness gleaned from application network manager 50). For example, application network manager 50 is configured to communicate with an application level (e.g., distributed application 30) and a network level (e.g., network 12) of communication system 10, such that application network manager 50 can exchange information between the application level and the network level. Application network manager 50 is an application implemented on one or more suitable network elements configured with appropriate hardware and software components to perform the operations described herein. For example, the application can be implemented on switches of network 14, hosts 16, external hosts 18, or other network element. In various embodiments, application network manager 50 can be implemented as a plug-in to the distributed application framework of network 12, allowing the distributed application to become network aware, improving network utilization, network performance, and/or network predictability for network 14 and/or distributed application 30. In various embodiments, application network manager 50 can include a processor 50 and a memory element 52 that can be used to perform operations described herein. The memory element 52 can store information associated with network 12, in some embodiments, consolidating information associated with network 14 and distributed application 30. Application network manager 50 can be a part of distributed application 30, such as a part of Hadoop® like application framework, or as a stand-alone application (in other words, separate from distributed application 30). In various embodiments, application network manager 50 and application scheduler 32 can reside in a same application. In some embodiments, application network manager 50 can be a distributed application. In some embodiments, application network manager 50 can be distributed across more than one application.

Application network manager 50 can receive (or collect) various network metrics from distributed application 30, network 12, other distributed application associated with communication system 10, and other network associated with communication system 10 (such as network 18). For example, application network manager 50 can receive network metric information associated with network elements of communication system 10, which can be used to monitor resource availability of the network elements associated with communication system 10. In various implementations, application network manager 50 can receive network metrics from switches of network 14 (here, ToR switches 22, access switches 24, core switches 26, and/or aggregate switches 28), such as switch latency information, bandwidth information (including but not limited to port send bandwidth percentage, port receive bandwidth percentage, overall port bandwidth percentage, etc.), data transfer rate information (including but not limited to port send frame rate, port receive frame rate, total port frame rate, etc.), data frame size information, data error information, and/or other switch-related network metrics. In various implementations, application network manager 50 can receive network metrics from distributed application 30 and/or from hosts 16, such as jobs in progress (including but not limited to which hosts 16 are analyzing data, which hosts 16 are storing data, which hosts 16 is data being transferred to/from, etc.), computing an/d/or storage capability of hosts 16 (including but not limited to input/output rate (including input/output operations per second (IOPS)), CPU utilization, memory utilization, and/or other computing/storage capability), and/or other distributed application and/or host related network metrics. Application network manager 50 can also glean such information from other distributed applications deployed in network 12, such as a distributed application that spans at least some of hosts 16 spanned by distributed application 30, and/or from other networks associated with network 12, such as network 20. From the various network metrics collected from communication system 10, application network manager 50 can generate planned network metrics for any network element of communication system 10. Planned network metrics (alternatively referred to as estimated network metrics) generally give a "snap shot" of future utilization of a network element. In the depicted embodiment, the snap shot can look any defined time into the future, such as a few minutes to an hour, based on planning guidelines for distributed application 30, network 12, and/or network 14. In some embodiments, application network manager 50 can generate planned network metrics as described in U.S. patent application Ser. No. 14/327,385, entitled Network Traffic Management Using Heat Maps with Actual and Planned Metrics, filed on Jul. 9, 2014, the entire disclosure of which is incorporated herein by reference.

Application network 50 can generate planned network metrics for switches in communication system 10, such as ToR switches 22, access switches 24, core switches 26, and/or aggregate switches 28. The planned network metrics can give a snap shot of future bandwidth usage of a switch. For example, when distributed application 30 decides to replicate data from a node X to a node Y, application network manager 50 can determine that this transfer will pass through a single switch S using network information gleaned from network 12. Based on a size of the data being replicated, when the replication process started, and a current available bandwidth associated with switch S, application network manager 50 can determine that replicating the data will take some time n (for example, n seconds or n minutes). Application network manager 50 can then generate a planned bandwidth metric for switch S—in other words, estimate how much bandwidth associated with switch S will be used over some future time, such as a next few minutes up to an hour, using the data replication information gleaned from distributed application 30, along with network information associated with switch S gleaned from network 12, other networks, and/or other distributed applications (for example, another distributed application may have initiated a data transfer that will use switch S at some time during the replication process initiated by distributed application 30, of which distributed application 30 would be unaware). Using the planned bandwidth metric, application network manager 50 can better gauge available bandwidth associated with switch S. Such information can be shared with distributed application 30 to assist in data placement decisions.

Application network controller 50 can also generate planned network metrics for hosts in communication system 10, such as hosts 16. The planned network metrics can give a snap shot of future computing and/or storage capability of a host, such as input/output rate, CPU utilization, memory utilization, and/or other computing and/or storage capability. For example, when distributed application 30 decides to replicate data from node X to node Y, application network manager 50 can determine an input/output (I/O) utilization score for node X and/or node Y. Based on a size of the data being replicated, a current available I/O bandwidth associated with node Y, and any other planned data transfers associated with node Y, application network manager 50 can generate a planned I/O utilization score for node Y, which can include a planned I/O available bandwidth metric for node Y—in other words, estimate an available I/O bandwidth associated with node Y over some future time, such as a next few minutes up to an hour, using the data replication information gleaned from distributed application 30, along with computing and/or storage capability information associated with node Y, other networks, and/or other distributed applications (for example, another distributed application may have initiated a data transfer that will use node Y at some time during the replication process initiated by distributed application 30, of which distributed application 30 would be unaware). Using the planned I/O available bandwidth and/or IO utilization score, application network manager 50 can better gauge available computing and/or storage capabilities of node Y. In a specific scenario, where node Y includes a 4 TB (terabyte) memory and an I/O bandwidth of about 100 Mbps, and distributed application 30 designates node Y for placing about 1 TB (terabyte) of data, copying the data may take about 10,000 seconds (essentially 167 minutes or 2 hours, 47 minutes). Since application network manager 50 is aware of the network metrics associated with node Y, application network manager 50 can share such information with distributed application 30 to assist in future data placement decisions, such that additional data replication tasks to node Y can be avoided during the replication of data from node X to node Y (which could significantly slow the data transfer rate).

In another specific scenario, assume that one of hosts 16 (a server) spanned by distributed application 30 can store from 24 TB to 48 TB of data depending on various configurations. Big data deployments often allow about 50% to 70% storage usage, making available data storage on the server from 16 TB to 33 TB. If the server goes down (for example, a server crash or unplanned shutdown) or decommissions (for example, a planned outage), then distributed application 30 needs to replicate (copy) this 16 TB to 33 TB of data to other hosts 16 (other servers). Assuming the BigData deployment approaches 10 Gbps, copying 16 TB to 33 TB of data utilizing full bandwidth can consume anywhere from 12,800 seconds to 26,400 seconds, which translates to anywhere from 213 minutes (3 hours, 33 minutes) to 440 minutes (7 hours, 20 minutes). This scenario considers traffic on a single network link. However, in distributed application frameworks such as Hadoop® like application frameworks, the replicas are copied from the down or decommissioned server using a few network links of the network on different network elements (different switches) for carrying most of the traffic for some estimated future time, such as the next few minutes or hours. Using planned metrics, application network manager 50 can share such knowledge with an application level of communication system 10, preventing distributed application 30 or other distributed applications associated with network 12 from placing data among servers using those network links for the estimated future time. Accordingly, since distributed application 30 communicates with application network manager 50 in a manner that notifies application network manager 50 that a server will be down or decommissioned (for example, via distributed application time outs), application network manager 50 can generate planned network metrics indicating future network usage over some period of time, such as the next few minutes to next few hours, and share such planned network metrics with distributed application 30 in a manner that allows distributed application 30 to intelligently place data based on current and future behavior of network 12.

According to teachings of the present disclosure, as noted above, distributed application 30 can identify candidates for placing data and then assign data to one of the candidates using network intelligence gleaned from application network manager 50. For example, application network manager 50 can communicate various network metrics, such as those described above, associated with the candidates to distributed application 30. Distributed application 30 can then evaluate the various network metrics associated with each candidate to assign the data to one of the candidates in a manner that optimizes network utilization, including datacenter resource utilization.

As noted above, ddistributed application 30 (such as application scheduler 32) can identify candidates based on data placement policy 34, replica placement policy 36, scheduling policy, and/or other policy—generating a list of potential destination nodes Y1, Y2, . . . , Y(j-1), and Yj for the data. Distributed application 30 can provide the list of potential destination nodes Y1, Y2, . . . , Y(j-1), and Yj to application network manager 50, which can analyze various network metrics associated with each potential destination node Y1, Y2, . . . , Y(j-1), and Yj. For each candidate Y[i] (where i is 1, 2, . . . , j), application network manager 50 can determine an overall latency associated with transferring data from source node X to candidate destination node, Y[i]. In various implementations, the overall latency from source node X to potential destination node Y[i] can be calculated using the following network metric functions:

$$\text{Overall Latency from } X \text{ to } Y[i] = K \times [A*f(\text{Number of Hops Between } X \text{ and } Y[i])] \times [B*f(\text{Aggregate Latency of Network Elements associated with Hops Between } X \text{ and } Y[i])] \times [C*f(\text{Aggregate Time for Transferring Data based on Data Size and Network Bandwidth of Each Network Element associated with Hops Between } X \text{ and } Y[i])] \times [D*f(\text{Aggregate Time for Transferring Data based on Data Size and Planned Available Bandwidth Metric of Each Network Element associated with Hops Between } X \text{ and } Y[i])] \times [E*f(\text{Planned Available Input/Output Bandwidth Metric at } Y[i])] \times [F*f(\text{IOPS at } Y[i])]$$

where f(Number of Hops Between X and Y[i]) is a function that represents a number of hops between source node X and potential destination node Y[i]; f(Aggregate Latency of Network Elements associated with Hops Between X and Y[i]) is a function that collectively represents a latency associated with network elements (for example, switches such as ToR switches 22, access switches 24, core switches 26, and/or aggregate switches 28) at each hop between source node X and potential destination node Y[i]; f(Aggregate Time for Transferring Data based on Data Size and Network Bandwidth of Each Network Element associated with Hops Between X and Y[i]) is a function that collectively represents how long it will take to transfer data from source node x to potential destination node Y[i] based on a size of the data and a current bandwidth of each network element (for example, switches such as ToR switches 22, access switches 24, core switches 26, and/or aggregate switches 28) at each hop; f(Aggregate Time for Transferring Data based on Data Size and Planned Available Bandwidth Metric of Each Network Element associated with Hops Between X and Y[i]) is a function that collectively represents how long it will take to transfer data from source node x to potential destination node Y[i] based on a size of the data and an estimated available bandwidth for a defined time in the future of each network element at each hop; f(Planned Available Input/Output Bandwidth Metric at Y[i]) is a function that represents an estimated input/output bandwidth for the potential destination node Y[i] for the defined time in the future; f(IOPS at Y[i]) is a function that represents a current input/output operations per second for potential destination node Y[i] (for example, representing a current read and/or write data rate); A, B, C, D, E, and F are weight parameters associated with the functions used to calculate the overall latency; and K is normalization constant. In various implementations, $f$(Aggregate Time for Transferring Data based on Data Size and Planned Available Bandwidth Metric of Each Network Element associated with Hops Between $X$ and $Y[i]$)=Aggregate Time for Transferring Data based on Data Size and $f$(Current Network Bandwidth for Each Hop−Estimated Network Bandwidth Utilization for Each Hop for Current to Near Future); and $f$(Planned Available Input/Output Bandwidth Metric at $Y[i]$)=f(Current IO Bandwidth of $Y[i]$−Estimated IO Bandwidth Utilization for $Y[i]$ for Current to Near Future)

Distributed application 30 and/or application network manager 50 can be tuned to set weight parameters A, B, C, D, E, and F to equally weight the various network metric functions, such that no network metric function is prioritized over another network metric function. Distributed application 30 and/or application network manager 50 can also be tuned to vary weight parameters A, B, C, D, E, and F to prioritize (weight) one network metric function over other network metric functions. For example, distributed application 30 and/or application network manager 50 may give aggregate network latency highest priority (for example, in a high frequency trading network) by giving weight parameter B a higher value than weight parameters A, C, D, E, and F. In another example, distributed application 30 and/or application network manager 50 may be tuned to give IOPS highest priority (for example, in a database application) by giving weight parameter F a higher value than weight parameters A, B, C, D, and E. The present disclosure further contemplates implementations where application network manager 50 calculates overall latency using one, some, or all of the network metric functions.

Application network manager 50 can communicate (send) a determined overall latency for each potential destination node Y1, Y2, . . . , Y(j-1), and Yj to distributed application 30. In various implementations, application network manager 50 provides a sorted list of overall latency for transferring data from source node X to each potential destination node Y1, Y2, . . . , Y(j-1), and Yj, where the list can sort the destination nodes from lowest to highest overall latency. Distributed application 30 can evaluate the overall latency associated with each candidate and identify a best candidate based on a job priority and/or a service level agreement (SLA) for the job (for example, in some implementations, jobs associated with paying customers could be ranked as best candidates, which will experience a lowest latency, while internal test jobs could be ranked as mediocre or lowest ranked candidates to ensure that latency issues will not affect the jobs associated with paying customers in the distributed application framework). For example, distributed application 30 can identify the candidate associated with a least overall latency, such as destination node Y2, and then assign the data to the identified candidate, destination node Y2. Alternatively, in some implementations, application network manager 50 can identify a candidate associated with the least overall latency, notify distributed application 30 of the candidate, and then distributed application 30 can assign the data to the candidate identified by application network manager 50. In the various scenarios, for candidates with a same or similar overall latency, distributed application 30 and/or application network manager 50 can select the candidate by weighting one of the network metric functions used to determine the overall latency. For example, distributed application 30 and/or application network manager 50 may choose the candidate associated with a higher aggregate planned available bandwidth metric, less aggregate latency, and/or less number of hops depending on network topology and distributed application requirements. Further, once a candidate is chosen for placing the data, application network manager 50 can update planned metric information associated with communication system 10.

In various embodiments, network 12 can implement an application-defined networking (ADN) or software-defined networking (SDN) environment, where an application can adapt network 12 to meet requirements (for example, network and/or security policies) of the application. In SDN networking environments, network 12 can be configured to decouple a control plane and a data plane, moving the control plane (such as network intelligence and policy making) to an application, which can be referred to as an SDN controller. In such scenarios, application network manager 50 can be implemented as an SDN controller for network 12. In various embodiments, communication between the distributed application framework and network framework can be implemented as part of SDN applications using available communication technologies, such as OpenFlow, SNMP, onePK (Cisco® One Platform Kit), for communication with network 12 to gather information.

Figure 3:
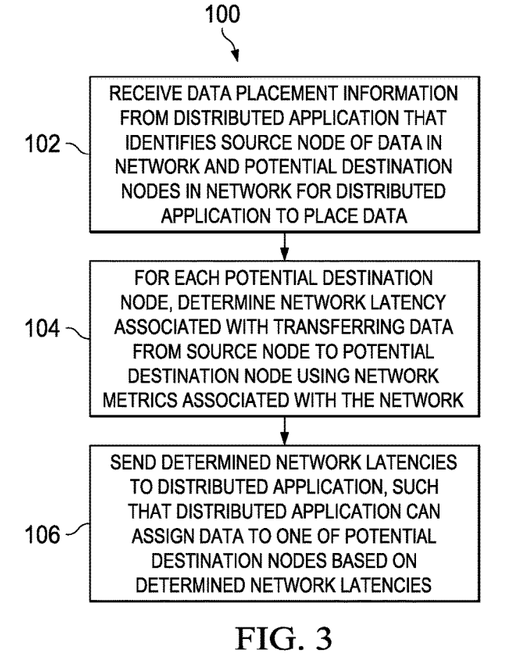
FIG. 3 is a simplified flow diagram illustrating example operations that can be associated with an embodiment of the communication system.

Turning to FIG. 3, FIG. 3 is a simplified flow diagram illustrating an exemplary method 100 that may be associated with embodiments of communication system 10. In various embodiments, method 100 can involve application network manager 50 communicating with distributed application 30 and network 12 to achieve application level awareness for network 14 and network level awareness for distributed application 30. At block 102, data placement information is received from a distributed application that identifies a source node of data in a network and a list of potential destination nodes in the network for the distributed application to place the data. At block 104, for each potential destination node, a network latency associated with transferring the data from the source node to the potential destination node is determined using network metrics associated with the network. At block 106, the determined network latencies are sent to the distributed application, such that the distributed application can assign the data to one of the potential destination nodes based on the determined network latencies.

Figure 4:
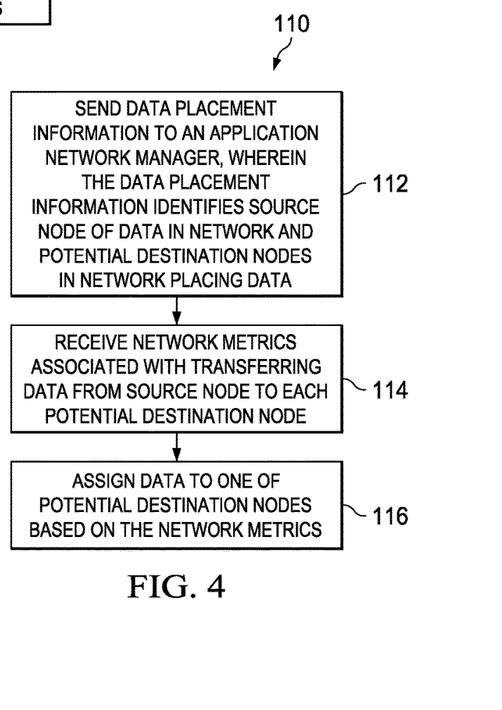
FIG. 4 is a simplified flow diagram illustrating example operations that can be associated with an embodiment of the communication system.

Turning to FIG. 4, FIG. 4 is a simplified flow diagram illustrating an exemplary method 110 that may be associated with embodiments of communication system 10. In various embodiments, method 110 can involve application network manager 50 communicating with distributed application 30 and network 12 to achieve application level awareness for network 14 and network level awareness for distributed application 30. At block 112, a distributed application sends data placement information to an application network manager, where the data placement information identifies a source node of data in a network and a list of potential destination nodes in the network for placing the data. At block 114, the distributed application receives network metrics associated with transferring data from the source node to each potential destination node. In various implementations, the network metrics may define a network latency associated with transferring data from the source node to each potential destination node. At block 116, the distributed application can assign the data to one of the potential destination nodes based on the network metrics, such as the network latency.

The foregoing discussion describes a distributed application framework for intelligently placing data using network level awareness at the application level, which is described herein in a context of Hadoop® like application frameworks. It is noted that the present disclosure is not limited to Hadoop® like application frameworks, and the intelligent data placement schemes described herein can be applied to any distributed application framework. Such configurations can improve network utilization, improve workload scheduling efficiency, and/or improve network traffic prioritization.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", "various implementations", and the like are intended to mean that any such features are included in one or more embodiments of the present disclosure, but may or may not necessarily be combined in the same embodiments.

In example implementations, at least some portions of the activities outlined herein may be implemented in software in, for example, distributed application 30 and/or application network manager 50. In some embodiments, one or more of these features may be implemented in hardware, provided external to these elements, or consolidated in any appropriate manner to achieve the intended functionality. The various network elements (e.g., switches of network 14, hosts 16, distributed application 30 and/or application network manager 50) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, distributed application 30, application network manager 50, and/or other components of communication system 10 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 52) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein. In one example, processors (e.g., processor 50) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 52) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving data placement information from a distributed application that identifies a source node of data in a network and a list of potential destination nodes in the network for the distributed application to place the data;
   for each potential destination node, determining a network latency associated with transferring the data from the source node to the potential destination node using network metrics associated with the network; and
   sending the determined network latencies to the distributed application, such that the distributed application can assign the data to one of the potential destination nodes based on the determined network latencies;
   wherein the determining network latency comprises determining an overall latency (OL) from the source node (SN) to the potential destination node (PDN), as follows:
   OL=K×[A×(Number of Hops Between SN and PDN)]× [B×(Aggregate Latency of Network Elements associated with Hops Between SN and PDN)]×[C×(Aggregate Time for Transferring Data based on Data Size and Network Bandwidth of Each Network Element associated with Hops Between SN and PDN]×[D×(Aggregate Time for Transferring Data based on Data Size and Planned Available Bandwidth Metric of Each Network Element associated with Hops Between SN and PDN)]×[E×(an estimate of input/output bandwidth for PDN for a defined time in the future)]×[F×(current input/output operations per second PDN)];
   where A, B, C, D, E, F and K are non-zero constants.

2. The method of claim 1, further comprising, based on the determined network latencies, identifying a best potential destination node from the list of potential destination nodes for placing the data.

3. The method of claim 2, wherein the best potential destination node exhibits lowest network latency.

4. The method of claim 2, further comprising ranking potential destination nodes having a same determined network latency by weighting one network metric over another network metric.

5. The method of claim 1, further comprising generating planned network metrics for the network, wherein the planned network metrics indicate future utilization of the network, and further wherein the network metrics used to determine the network latency include the planned network metrics.

6. The method of claim 5, further comprising updating the planned network metrics once the distributed application assigns the data to one of the potential destination nodes.

7. The method of claim 5, wherein generating the planned network metrics includes determining storage capabilities for each of the potential destination nodes.

8. The method of claim 1, further comprising collecting the network metrics from the network and the distributed application.

9. The method of claim 1, wherein for each potential destination node, the network latency is a function of one or more of the following network metrics:
   a number of hops between the source node and the potential destination node;
   an aggregate network latency of network elements associated with each hop between the source node and the potential destination node;
   an aggregate time for transferring data based on data size and network bandwidth associated with each hop between the source node and the potential destination node;
   an aggregate time for transferring data based on data size and planned available network bandwidth associated with each hop between the source node and the potential destination node;
   a planned input/output bandwidth for the potential destination node for the future time period; and
   an input/output operations per second for the potential destination node.

10. The method of claim 9, further comprising weighting the network metrics to determine the network latency.

11. Logic encoded in non-transitory media that includes instructions for execution and when executed by a processor, is operable to perform operations comprising: receiving data placement information from a distributed application that identifies a source node of data in a network and a list of potential destination nodes in the network for the distributed application to place the data;
    for each potential destination node, determining a network latency associated with transferring the data from the source node to the potential destination node using network metrics associated with the network; and
    sending the determined network latencies to the distributed application, such that the distributed application can assign the data to one of the potential destination nodes based on the determined network latencies;

wherein the determining network latency comprises determining an overall latency (OL) from the source node (SN) to the potential destination node (PDN), as follows:

OL=K×[A×(Number of Hops Between SN and PDN)]×[B×(Aggregate Latency of Network Elements associated with Hops Between SN and PDN)]×[C×(Aggregate Time for Transferring Data based on Data Size and Network Bandwidth of Each Network Element associated with Hops Between SN and PDN]×[D×(Aggregate Time for Transferring Data based on Data Size and Planned Available Bandwidth Metric of Each Network Element associated with Hops Between SN and PDN)]×[E×(an estimate of input/output bandwidth for PDN for a defined time in the future)]×[F×(current input/output operations per second PDN)];

where A, B, C, D, E, F and K are non-zero constants.

12. The logic of claim 11, the operations further including, based on the determined network latencies, identifying a best potential destination node from the list of potential destination nodes for placing the data.

13. The logic of claim 12, the operations further including ranking potential destination nodes having a same determined network latency by weighting one network metric over another network metric.

14. The logic of claim 13, the operations further including, generating planned network metrics for the network, wherein the planned network metrics indicate future utilization of the network, and further wherein the network metrics used to determine the network latency include the planned network metrics.

15. The logic of claim 14, the operations further including updating the planned network metrics once the distributed application assigns the data to one of the potential destination nodes.

16. The logic of claim 11, wherein for each potential destination node, the network latency is a function of one or more of the following network metrics:
 a number of hops between the source node and the potential destination node;
 an aggregate network latency of network elements associated with each hop between the source node and the potential destination node;
 an aggregate time for transferring data based on data size and network bandwidth associated with each hop between the source node and the potential destination node;
 an aggregate time for transferring data based on data size and planned available network bandwidth associated with each hop between the source node and the potential destination node;
 a planned input/output bandwidth for the potential destination node for the future time period; and
 an input/output operations per second for the potential destination node.

17. An apparatus comprising:
a memory element for storing data; and
a processor operable to execute instructions associated with the data, wherein the processor and the memory element cooperate such that the apparatus is configured for:

receiving data placement information from a distributed application that identifies a source node of data in a network and a list of potential destination nodes in the network for the distributed application to place the data;

for each potential destination node, determining a network latency associated with transferring the data from the source node to the potential destination node using network metrics associated with the network; and sending the determined network latencies to the distributed application, such that the distributed application can assign the data to one of the potential destination nodes based on the determined network latencies;

wherein the determining network latency comprises determining an overall latency (OL) from the source node (SN) to the potential destination node (PDN), as follows:

OL=K×[A×(Number of Hops Between SN and PDN)]×[B×(Aggregate Latency of Network Elements associated with Hops Between SN and PDN)]×[C×(Aggregate Time for Transferring Data based on Data Size and Network Bandwidth of Each Network Element associated with Hops Between SN and PDN]×[D×(Aggregate Time for Transferring Data based on Data Size and Planned Available Bandwidth Metric of Each Network Element associated with Hops Between SN and PDN)]×[E×(an estimate of input/output bandwidth for PDN for a defined time in the future)]×[F×(current input/output operations per second PDN)];

where A, B, C, D, E, F and K are non-zero constants.

18. The apparatus of claim 17, further configured for, based on the determined network latencies, identifying a best potential destination node from the list of potential destination nodes for placing the data.

19. The apparatus of claim 18, further configured for ranking potential destination nodes having a same determined network latency by weighting one network metric over another network metric.

20. The apparatus of claim 17, further configured for generating planned network metrics for the network, wherein the planned network metrics indicate future utilization of the network, and further wherein the network metrics used to determine the network latency include the planned network metrics.

* * * * *